UNITED STATES PATENT OFFICE 2,562,873

PRODUCTION OF 3-CHLOROCOUMARIN

Wesley C. Stoesser, Midland, and Edmund H. Sommerfield, Bay City, Mich., assignors to The Dow Chemical Company, Midland, Mich., a corporation of Delaware No Drawing. Application January 19, 1950,
Serial No. 139,544

2 Claims. (Cl. 260—344.6)

This invention relates to the production of 3-chlorocoumarin.

Before our invention it was known that a chloroform-solution of coumarin could be chlorinated by molecular chlorine. This chlorination produced dichlorocoumarin which would undergo thermal dehydrochlorination to 3-chlorocoumarin (cf. J. Chem. Soc. 24, 43 and 44 (1871)). The reactions which are believed to proceed are illustrated by Equations 1 and 2, below, (1)
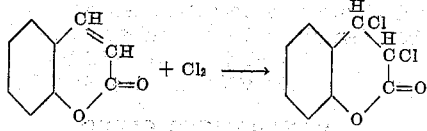

(2)
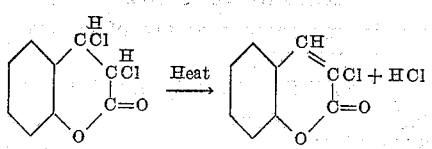

According to our invention, 3-chlorocoumarin is produced by contacting chlorine with solvent-free molten coumarin; the chlorination is carried out in the absence of any catalyst for the chlorination of a benzene ring. It is unexpected that the method of the invention provides an advantageous way for chlorinating coumarin. If it had been assumed that direct chlorination of molten coumarin was possible, one of two hypotheses would have been adopted: either (1) the chlorination would proceed as illustrated in Equation 1, above, to produce dichlorocoumarin (in which case the assumed method would require the separate dehydrochlorination step illustrated by Equation 2), or (2) dehydrochlorination would proceed concurrently with chlorination so that the overall reaction would be represented by Equation 3, below, (3)
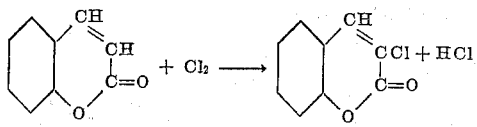

(in which case it would be expected that the 3-chlorocoumarin product would undergo chlorination simultaneously with the remaining coumarin so that a relatively worthless mixture of materials would be obtained). It has now been found that chlorination of molten coumarin does produce 3-chlorocoumarin directly, but that this product is not further chlorinated to any appreciable extent in the course of the process of the invention. This method is advantageous over that of the prior art as providing a way of producing 3-chlorocoumarin, in high yields, at lower cost for equipment, labor and material; the method also avoids the difficult dehydrochlorination involved in the prior art process.

The reaction of the invention proceeds readily when chlorine and liquid coumarin are contacted. The coumarin is not dissolved in any solvent, but need not be highly refined (e. g., the unrecrystallized product recovered after the production of coumarin from salicylaldehyde, acetic anhydride and sodium acetate is a highly satisfactory starting material). It is essential that the coumarin be maintained in the liquid phase throughout the course of the chlorination. This is accomplished by supplying enough heat in the early stages of the reaction to keep the coumarin molten; in the later stages exothermic reaction provides the necessary heat to keep the coumarin liquid.

The reaction is carried out in the absence of any ring chlorinating catalyst such as a metallic halide, or a ferric metal. Since the reaction proceeds readily in the absence thereof, there is ordinarily no reason to use ultraviolet light as a catalyst for the chlorination of the aliphatic portion of the coumarin molecule. Metallic reactors are ordinarily inoperable because they act as catalysts for ring chlorination. Accordingly, a ceramic reaction vessel is ordinarily employed. Glass is a convenient reaction vessel, as are impregnated graphite vessels. Polymerized tetrafluoroethylene is a satisfactory gasket material. In general, any low-iron ceramic reaction vessel can be employed.

The chlorination is ordinarily carried out at room pressure, although either super-atmospheric or sub-atmospheric pressures may be used if desired. The temperature at which the reaction is conducted must be in excess of the melting temperature of the coumarin composition (pure coumarin melts at 68° C.–69° C..). Ordinarily there is no reason to employ temperatures higher than about 125° C. in chlorinating coumarin according to the invention, or lower than about 70° C.

The chlorocoumarin is produced according to the process of the invention in high yields (e. g., as high as about 85 per cent). Because of the high yields achieved, and because of the comparative values of coumarin and 3-chlorocoumarin it is usually economically disadvantageous to recover the unreacted coumarin from the chlorination products. Sufficiently pure chlorocoumarin for ordinary use is recovered by crystallization from aqueous isopropyl alcohol, and it is usually preferred merely to discard other products. Accordingly, it is usually advantageous to use at least about one mol of chlorine per mol of coumarin to be chlorinated, as this avoids the presence of a large amount of unchlorinated coumarin. It is usually most advantageous to use from about 1.0 to about 1.2 mols of chlorine per mol of coumarin, although even higher proportions of chlorine may be used if desired. In some instances it may be desirable to use a substantially lower ratio of chlorine to coumarin (e. g., as little as about one-half mol of chlorine per mol of coumarin), and to recycle unchlorinated coumarin separated from the 3-chlorocoumarin.

The rate of chlorine addition should not be unreasonably high. For example, it is preferred to add one mol of chlorine per mol of coumarin to be chlorinated in not less than about 90 minutes; slower addition rates can be used, but it is usually desired, for economic reasons, to add the chlorine in not more than about 200 minutes, and preferred to add it in not more than about 150 minutes.

The following examples illustrate and disclose, but are not to be construed as limiting the invention.

Example 1

Solvent-free molten coumarin was chlorinated according to the following procedure:

Molten coumarin (31.2 pounds) was placed in a glass column fitted with a perforated plate at the bottom through which chlorine was bubbled into the coumarin, and a vent at the top attached to an HCl absorber. When the temperature of the coumarin was 114° C. chlorine (a total of 16 pounds) was bubbled into the coumarin; the chlorine addition was made over a period of 132 minutes, during which time the temperature of the coumarin was maintained between about 109° C. and about 119° C. When the chlorination was completed, the product was placed in open vessels and heated at about 125° C. for one hour to free the product as completely as possible of HCl. After this open-vessel heating, the product was combined with a second batch of crude product produced as descroibed above except that the temperature was allowed to vary between about 98° C. and about 125° C. during chlorination. Pure 3-chlorocoumarin was recovered from the combined crude product by crystallization from 290 pounds of an aqueous isopropyl alcohol solution containing 85 weight per cent of isopropanol. The 3-chlorocoumarin recovered amounted to 60 pounds and had a melting point of 120° C.–121.5° C. This corresponds to an 82.4 per cent yield based upon the coumarin charged.

Example 2

Further coumarin chlorinations were carried out by procedures similar to that described in Example 1, except that a mol ratio of chlorine to coumarin of from 1.09:1 to 1.11:1, instead of the ratio of 1.05:1 used in Example 1, was employed. Results substantially identical with those of the preceding example were achieved.

We claim:

1. A method of producing 3-chlorocoumarin that comprises contacting chlorine with solvent-free molten coumarin, in a mol ratio from 1.0:1 to 1.2:1, in the absence of a ring chlorinating catalyst.

2. A method as claimed in claim 1 in which the chlorination is accomplished at a temperature between about 70° C. and about 125° C.

WESLEY C. STOESSER.
EDMUND H. SOMMERFIELD.

REFERENCES CITED

The following references are of record in the file of this patent:

UNITED STATES PATENTS

| Number | Name | Date |
| --- | --- | --- |
| 2,342,173 | Wise | Feb. 22, 1944 |
| 2,432,470 | Clifford | Dec. 9, 1947 |
| 2,478,824 | Halbedel | Aug. 9, 1949 |